United States Patent
Crawford et al.

(10) Patent No.: US 9,244,525 B2
(45) Date of Patent: Jan. 26, 2016

(54) SYSTEM AND METHOD FOR PROVIDING USER INTERACTION WITH PROJECTED THREE-DIMENSIONAL ENVIRONMENTS

(75) Inventors: David Crawford, Long Beach, CA (US); Edward Nemeth, Hermosa Beach, CA (US); Asa K. Kalama, South Pasadena, CA (US); Mark R. Mine, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 589 days.

(21) Appl. No.: 12/378,887

(22) Filed: Feb. 19, 2009

(65) Prior Publication Data

US 2010/0210361 A1    Aug. 19, 2010

(51) Int. Cl.
*A63F 9/24* (2006.01)
*G06F 3/01* (2006.01)
*G06F 3/03* (2006.01)
*G06F 3/0346* (2013.01)
*G06F 3/0481* (2013.01)

(52) U.S. Cl.
CPC .............. *G06F 3/011* (2013.01); *G06F 3/0304* (2013.01); *G06F 3/0346* (2013.01); *G06F 3/04815* (2013.01)

(58) Field of Classification Search
CPC ..... G06F 3/011; G06F 3/0304; G06F 3/0346; G06F 3/04815
See application file for complete search history.

(56) References Cited

U.S. PATENT DOCUMENTS 5,227,985 A     7/1993   DeMenthon
6,296,486 B1 *  10/2001  Cardaillac ............. F41G 3/2694
                                                           273/358
7,329,127 B2 *   2/2008  Kendir ................... F41G 3/2655
                                                            434/16
2002/0022518 A1* 2/2002  Okuda ..................... A63F 13/08
                                                            463/36
2003/0199325 A1* 10/2003 Wang ............................. 463/51

(Continued)

FOREIGN PATENT DOCUMENTS

EP         1 759 745 A1    3/2007

OTHER PUBLICATIONS

"Integration of Wireless Gesture Tracking, Object Tracking, and 3D Reconstruction in the Perceptive Workbench" *SpringerLink.* Apr. 22, 2009 <http://www.springerlink.com/content/dtctmpv4u741c47x/>.

*Primary Examiner* — Peter Bradford
(74) *Attorney, Agent, or Firm* — Farjami & Farjami LLP

(57) ABSTRACT

There is provided an interactive device capable of providing input data to a computer program in response to user interactions, the interface device comprising a first position sensor reading a sensed location of the interface device having a free roaming movement in a three-dimensional space, a direction vector determination device determining a direction vector indicating an aiming direction, and a transmission system communicating aim information to an external device implementing the computer program. The transmission system may include a transmitter for the direction vector and/or a transmitter for the sensed location. The computer program can use the aim information and input data to support a projected 3D game environment or other application providing sensory feedback in response to the user interactions. Multiple interactive devices having unique identifiers may also be supported. The interactive device enables significant freedom to roam relative to implementing equipment, as compared to existing interactive devices having only a limited range of movement relative to implementing equipment.

10 Claims, 4 Drawing Sheets

(56) References Cited

U.S. PATENT DOCUMENTS

| | | | |
|---|---|---|---|
| 2004/0266528 A1* | 12/2004 | Wang | 463/37 |
| 2005/0202870 A1* | 9/2005 | Kawamura | 463/36 |
| 2005/0224582 A1* | 10/2005 | Aiki et al. | 235/472.01 |
| 2005/0272506 A1* | 12/2005 | Sumi | 463/51 |
| 2006/0154726 A1* | 7/2006 | Weston et al. | 463/37 |
| 2006/0209018 A1* | 9/2006 | Watanabe et al. | 345/156 |
| 2007/0013657 A1* | 1/2007 | Banning | 345/157 |
| 2007/0218965 A1* | 9/2007 | Tilston et al. | 463/2 |
| 2007/0263003 A1* | 11/2007 | Ko et al. | 345/502 |
| 2008/0070684 A1 | 3/2008 | Haigh-Hutchinson | |
| 2008/0180395 A1* | 7/2008 | Gray | 345/157 |
| 2008/0261693 A1* | 10/2008 | Zalewski | 463/31 |
| 2009/0111073 A1* | 4/2009 | Stanley | F41A 33/00 434/21 |
| 2011/0118032 A1* | 5/2011 | Zalewski | 463/39 |
| 2011/0269540 A1* | 11/2011 | Gillo et al. | 463/31 |
| 2013/0084981 A1* | 4/2013 | Zalewski | A63F 9/24 463/36 |

\* cited by examiner

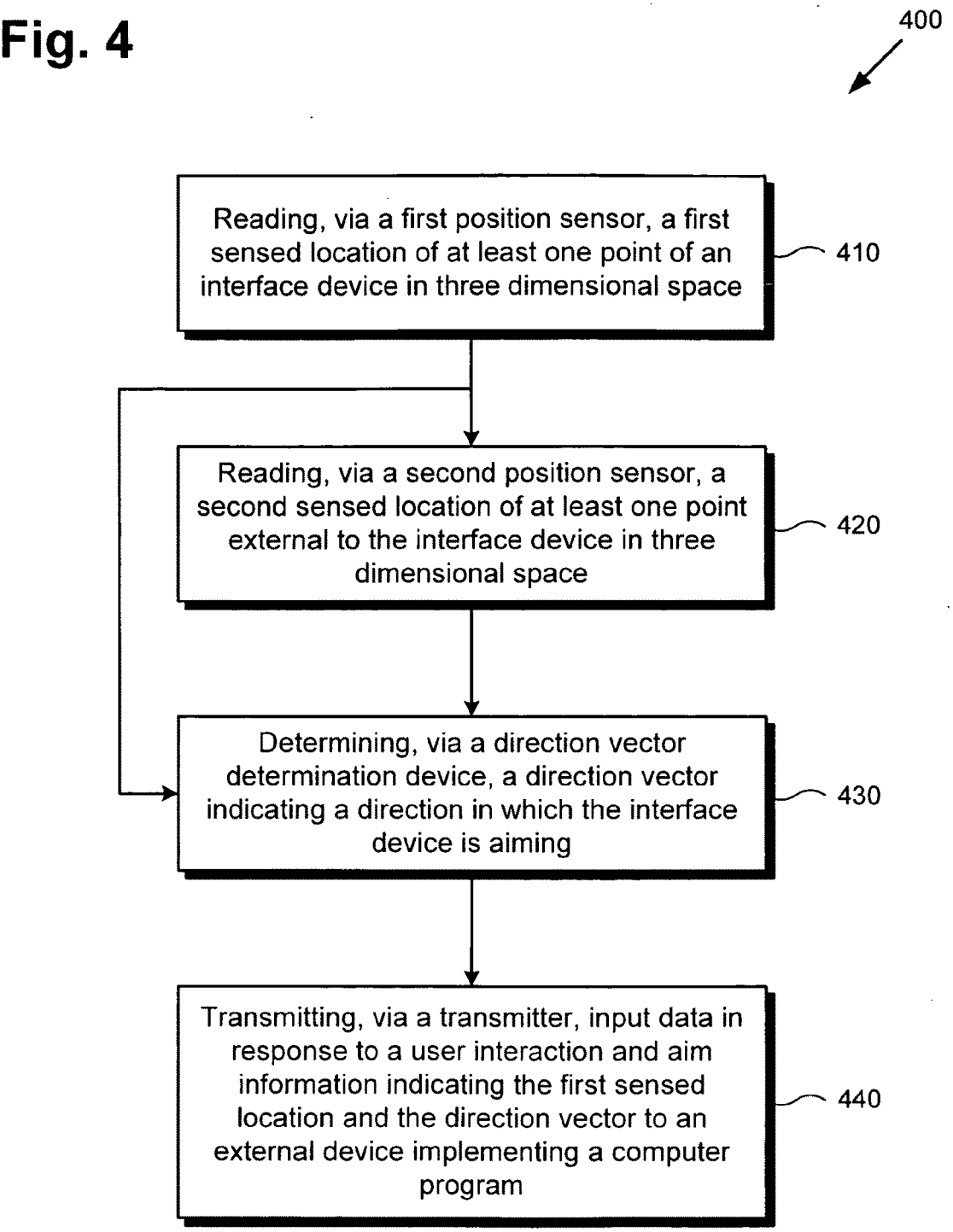

SYSTEM AND METHOD FOR PROVIDING USER INTERACTION WITH PROJECTED THREE-DIMENSIONAL ENVIRONMENTS

BACKGROUND OF THE INVENTION

1. Field of the Invention

The present invention relates generally to game systems. More particularly, the present invention relates to interactive game systems.

2. Background Art

Gaming systems integrating physical movement to supplement or replace traditional gaming paradigms have attracted increasing interest from both users and developers. By implementing motion control and other technologies, these gaming systems can free users from the constraints of traditional gaming systems. Users are no longer restricted to merely a traditional game-pad or joystick and a video screen, but can now physically gesture or touch objects to interact with game worlds. These new and immersive gaming experiences are quickly gaining popularity and appeal to new and wider audiences.

However, many of these new gaming systems still rely on traditional constructs, such as a two dimensional video screen. These traditional constructs constantly remind users that they are still merely people playing video games, and not swashbuckling pirates, heroic gladiators, or expert marksmen. In the end, without increased immersion, users cannot suspend their notions of disbelief and still recognize that they are just manipulating a fancy controller affecting a video display.

One effective method of increasing user immersion is to provide a convincing interactive environment, rather than a flat two-dimensional display. With recent advances in display technologies, providing immersive three-dimensional projected environments in large-scale environments is possible. For directional applications involving target aiming such as gun shooting, laser pointers, or other devices, providing convincing environmental responses is key to maintaining a sense of immersion. However, many existing interactive gaming systems providing directional targeting are still fairly restrictive in terms of freedom of physical movement. Often, there is a very limited range of detection such as a single two-dimensional display, or a directional targeting device is fixed in a relatively stationary position, such as a mounted gun with encoder position feedback.

Without providing large or free roaming environments that can react convincingly to user interactions, it will remain difficult to achieve a suspension of disbelief for providing a fully immersive gaming experience. Although physical motion has seen adoption in many new gaming systems, they are often still used within the context of a limited environment and tied to a single two-dimensional video display. Thus, these new gaming systems have largely failed to achieve a full and convincing immersion due to restrictive positioning or a limited environment for interactivity.

Accordingly, there is a need to overcome the drawbacks and deficiencies in the art by providing a way for a user to naturally interact with an immersive gaming environment in a manner that provides a convincing suspension of disbelief.

SUMMARY OF THE INVENTION

There are provided systems and methods for providing user interaction with projected three-dimensional environments, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which an interface device (ID) capable of free roaming movement can provide a sensory feedback attributable to a user interaction with the ID.

DETAILED DESCRIPTION OF THE INVENTION

The present application is directed to a system and method for providing user interaction with projected three-dimensional environments. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
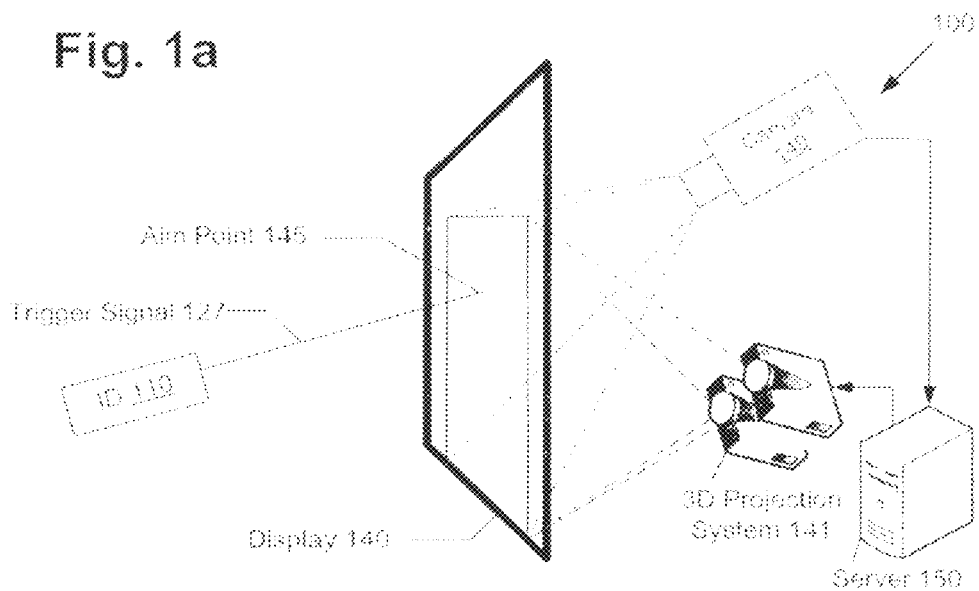
FIGS. 1a and 1b present diagrams of a projected three-dimensional environment for use with an interface device (ID), according to one embodiment of the present invention.
Figure 1B:
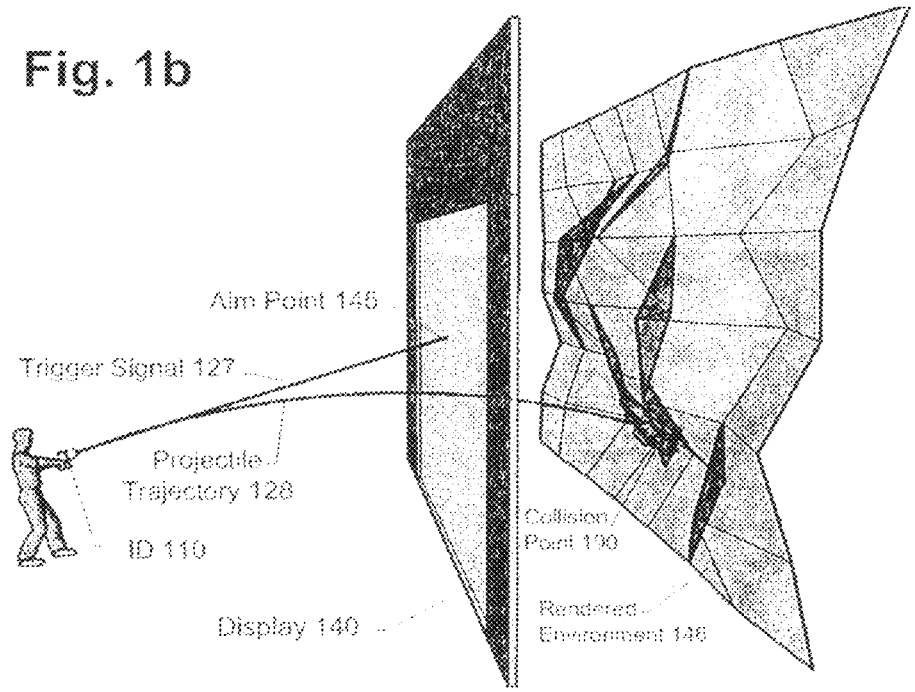

FIGS. 1a and 1b present diagrams of a projected three-dimensional environment for use with an interface device (ID), according to one embodiment of the present invention. Environment 100 of FIG. 1a includes ID 110, trigger signal 127, display 140, three-dimensional (or 3D) projection system 141, aim point 145, camera 149, and server 150. Environment 100 of FIG. 1b further includes projectile trajectory 128, rendered environment 146, and collision point 190.

FIG. 1a presents an overview of how an ID might be used in an exemplary interactive environment. ID 110, which might comprise the form factor of a futuristic gun, is held by a user or guest and aimed at aim point 145 of display 140, depicted in FIG. 1a as a flat two-dimensional display embedded in a wall. Although the user might ultimately aim for a visual target within a projected environment seeming to appear behind display 140 using 3D projection system 141, camera 149 may actually detect aim point 145 for the purposes of calculating the user's ultimate aim. Once the user pulls a trigger, pushes a button, or initiates some other interaction with ID 110, trigger signal 127 is radiated out from ID 110. Trigger signal 127 might comprise, for example, an encoded infrared signal, and may contain positional, aiming, and input data states from ID 110. Camera 149, which might comprise a high resolution, high frame rate infrared camera, is able to capture trigger signal 127 and send information regarding trigger signal 127 to server 150, including accurate positioning with respect to display 140. Server 150 can then perform calculations to extrapolate the user's ultimate target within the projected environment. Although infrared signals are used as an example for trigger signal 127, other methods could be used, such as magnetic, optical, radio frequency, or sound waves. If such alternative methods are used, then camera 149 may also be adjusted to detect the corresponding methods.

Additionally, ID 110 might use a position sensor such as a radio frequency identification (RFID) tag to provide an origin point corresponding to the position of ID 110 in three-dimensional space, allowing server 150 to track ID 110 assuming access to a corresponding RFID reader. Server 150 can then calculate a proper sensory feedback to generate in response, and send that sensory feedback to display 140 via 3D projection system 141. 3D projection system 141 could comprise, for example, a stereoscopic 3D projection system to be used in conjunction with specially shuttered, filtered or polarized glasses fitted on the user to create an illusion of 3D depth on a 2D screen.

FIG. 1b presents an alternate view of FIG. 1a, showing how display 140 might look to the user holding ID 110. Although display 140 is shown as a 2D display, due to 3D projection system 141 of FIG. 1a, the user may perceive rendered environment 146 as appearing to show behind or in front of display 140. Of course, rendered environment 146 is actually rendered flat on display 140, but from the viewing conditions of the user wearing the shuttered, filtered or polarized glasses, rendered environment 146 is perceived through stereoscopic illusion of depth.

Thus, after server 150 of FIG. 1a receives trigger signal 127, it may determine projectile trajectory 128 of FIG. 1b to calculate any resulting collisions, reflections, and other interactions that may occur in rendered environment 146. An aim line or direction vector similar to trigger signal 127 with an origin point starting at ID 110 and end point at aim point 145 might be used as an initial step for calculating projectile trajectory 128. The origin point may be provided by a position sensor, which may use, for example, infrared, magnetic, optical, radio frequency, or sound wave assisted tracking. Aim point 145 can be derived from position sensor measurements provided by camera 149. Thus, with the positions of ID 110 and aim point 145 known in 3D space, the aim line or direction vector can be derived by using the positions of ID 110 and aim point 145 as endpoints of a 3D line segment. Alternatively, if only the position of ID 110 is known in 3D space, the direction vector might be derivable from a direction vector determination device embedded in ID 110, which may, for example, comprise orientation detection hardware such as accelerometers. With the position of ID 110 and the direction vector provided by the direction vector determination device, the intersection of the direction vector with display 140 can be calculated to derive aim point 145 as the endpoint. Moreover, if each position sensor is capable of providing multiple detection points, then calculations for the direction vector might use the multiple points for increased accuracy.

If the projectile is simulated as a very high velocity object such as a light beam or a bullet, projectile trajectory 128 might use the above aim line unmodified, since the effects of simulated gravity or wind resistance could be essentially ignored. However, if the projectile did not travel at such a high velocity, then the effects of a set of simulated physics parameters might be applied to the aim line, leading to a more parabolic arc as shown by projectile trajectory 128 in FIG. 1b. Projectile trajectory 128 may vary depending on physics settings defined for rendered environment 146, which may be setup similar to conditions on Earth or adjusted to more fanciful values.

Once the user triggers ID 110 to send trigger signal 127 by pulling a trigger, pressing a button, or by another interaction, the user can observe the resulting projectile being rendered in 3D within rendered environment 146 shown on display 140, following projectile trajectory 128 until it interacts with some object in rendered environment 146. In FIG. 1b, projectile trajectory 128 simply ends by colliding into a rendered wall, which results in a small explosion at collision point 190. Besides visual feedback, other sensory feedback might be provided as well, such as vibration from ID 110 to simulate a gun kickback, lighting effects emanating from ID 110, sound effects, scoring, movement of environmental objects, and any other desired effect within rendered environment 146 or from ID 110.

In addition to embodiments where projectiles are depicted as shooting out of ID 110, alternative embodiments may provide for different play mechanics. For example, instead of comprising a gun shooting projectiles, ID 110 might comprise a gravity gun or tractor beam, causing attractive or repulsive movement of objects already in the environment rather than shooting new projectiles. Additionally, ID 110 might be toggled rather than a triggered for applications using a continuous on/off state, rather than discretely triggered initiations. For example, ID 110 might comprise a light saber that continuously projects a fixed length beam while in the on state, and is dormant in the off state. ID 110 may also vary projection widths, ranging from highly concentrated laser beams to widely dispersed flashlight beams. Thus, while ID 110 can be flexibly configured to provide for many different environmental interactions, for the sake of simplicity, example embodiments shall primarily focus on shooting projectile embodiments in the present application.

Although FIGS. 1a and 1b show a general overview of how user interaction might be provided with projected three-dimensional gaming environments, it is understood that server 150 is aware of the spatial position of ID 110. This position may be provided with elements not shown in FIG. 1, such as an embedded position sensor comprising an active or passive radio frequency identification (RFID) tag, an optical transmitter, a magnetic transmitter leveraging the Hall effect, or an ultrasonic sound wave propagator. The embedded position sensor might furthermore be supplanted or augmented with a corresponding position tracking system, such as an RFID reader, an optical camera, or a Hall effect sensor. For example, IDs might be externally labeled with unique colored patterns, and an optical camera might detect the colored patterns on the IDs to supplant an embedded position sensor. Alternative embodiments may instead augment an embedded position sensor, such as an active RFID tag that interfaces with an RFID reader tracking system. Position data might also be exchanged between ID 110 and server 150 via secondary channels separate from the location detection channels, such as wireless radio transmission on separate radio channels.

Moreover, orientation hardware for determining the orientation axes of ID 110 may allow more precise calculations for projectile trajectory 128. Simply assuming a head-on direction perpendicular to display 140 at aim point 145 may lead to undesirable results, as such approach may ignore any potential rotations of ID 110 about three-dimensional perpendicular axes, or yaw, pitch, and roll. Accordingly, in one embodiment of the present invention, some mechanism for providing six degrees of freedom or a satisfactory approximation may be utilized for a realistic and accurate calculation of projectile trajectory 128, as further discussed in conjunction with FIG. 2 below.

Figure 2:
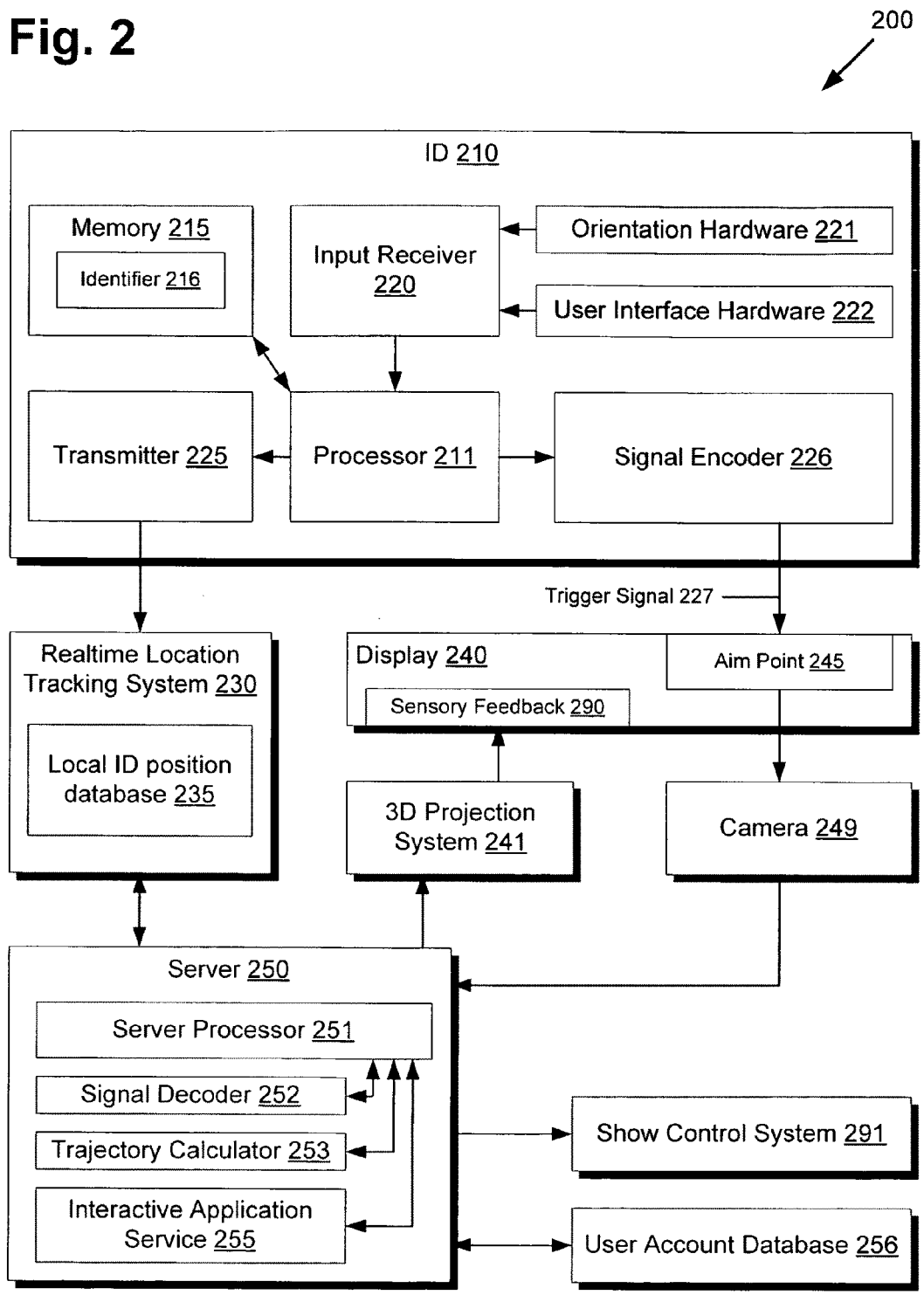
FIG. 2 presents a block diagram of an ID tracking system operating with an ID, according to one embodiment of the present invention.

FIG. 2 presents a block diagram of an ID tracking system operating with an ID, according to one embodiment of the present invention. Diagram 200 of FIG. 2 includes ID 210, trigger signal 227, real-time location tracking system 230, display 240, 3D projection system 241, camera 249, server 250, user account database 256, and show control system 291. ID 210 includes processor 211, memory 215, input receiver 220, orientation hardware 221, user interface hardware 222, transmitter 225, and signal encoder 226. Memory 215 includes identifier 216. Real-time location tracking system 230 includes local ID position database 235. Display 240 includes aim point 245 and sensory feedback 290. Server 250 includes server processor 251, signal decoder 252, trajectory calculator 253, and interactive application service 255.

With respect to FIG. 2, it should be noted that ID 210 corresponds to ID 110 from FIG. 1, trigger signal 227 corresponds to trigger signal 127, display 240 corresponds to display 140, 3D projection system 241 corresponds to 3D projection system 141, aim point 245 corresponds to aim point 145, camera 249 corresponds to camera 149, server 250 corresponds to server 150, and sensory feedback 290 corresponds to collision point 190.

FIG. 2 includes a hybrid six degrees of freedom detection system, comprising real-time location tracking system 230 and camera 249 in conjunction with server 250. With these subsystems in place, an accurate projectile trajectory such as projectile trajectory 128 of FIG. 1 can be derived from any ID. Moreover, by uniquely identifying IDs and associated aim lines or direction vectors, server 250 can also track and service multiple IDs concurrently. In this manner, server 250 can provide realistic and convincing reactions to any user interaction with an ID by providing sensory feedback that aligns with user expectations as to how the ID should interact with an environment.

FIG. 2 shows ID 210, which includes a breakdown of the components that might comprise an exemplary ID. Processor 211 might comprise, for example, a low power embedded applications controller, or a system-on-chip. One commonly used platform for embedded systems is the ARM architecture. Memory 215 might comprise, for example, flash memory holding volatile information as well as more permanent data such as identifier 216. Identifier 216 might simply comprise a unique number that identifies ID 210 from another ID, and might be written during manufacturing or after a user registration process. Besides embedding identifier 216 in memory 215, alternative methods of uniquely identifying an ID may be used in other embodiments. For example, each ID might be preset to a particular color, and camera 249 might match IDs by color. In an alternative embodiment, identifier 216 might be hardwired into the ID itself, rather than stored in general purpose memory 215. Input receiver 220 is a subsystem for handling user input and interactions with ID 210, and is thus connected to orientation hardware 221 and user interface hardware 222. Orientation hardware 221 might comprise, for example, accelerometers or other sensors capable of providing orientation readings regarding ID 210. Thus, as the user tilts and rotates ID 210, the components of orientation hardware 221 can correspondingly inform input receiver 220 of the changes to the orientation of ID 210. User interface hardware 222 might comprise input devices that are more directly manipulated by the user, such as buttons, switches, triggers, and other digital and analog inputs. As these input devices change state, their states can be reported to input receiver 220 for processing by processor 211. Transmitter 225 acts as a position sensor and provides positional and identification information to real-time location tracking system 230. Signal encoder 226 also acts as a position sensor and radiates trigger signal 227 to display 240 at aim point 245, which in turn is read by camera 249. As previously discussed in FIG. 1, trigger signal 227 might be radiated as an encoded infrared signal, or by using a number of alternative transmission methods. This allows the position of aim point 245 as well as other information from input receiver 220 to be passed to server 250.

Real-time location tracking system 230 may comprise, for example, a wireless ultra wideband radio frequency reader capable of detecting multiple RFID tags within a large area, and transmitter 225 may include an active RFID tag capable of wirelessly broadcasting the three-dimensional position of ID 210 and identifier 216 as a movable origin point of ID 210. Transmitter 225 may also communicate with server 250 via secondary channels separate from the RFID channels, such as via wireless radio transmission on separate radio channels. Real-time location tracking system 230 might keep a local periodically updated database of ID positions within local ID position database 235, mapping ID identifiers to ID positions or ID movable origin points. Thus, server 250 can request the position of any ID from real-time location tracking system 230 by simply querying the appropriate ID identifier. In this manner, server 250 can monitor and service multiple IDs concurrently, as it has a mechanism for identifying a particular ID within a group of detected IDs, and a mechanism for matching a trigger signal to an originating ID. Alternatively, as with FIG. 1, server 250 may be configured to service only one ID, in which case identifier 216 may be removed from memory 215.

The arrangement shown in FIG. 2 is merely exemplary, and many other configurations could be valid as well. For example, server 250, rather than real-time location tracking system 230, might maintain local ID position database 235, multiple servers might be utilized for load balancing, and trigger signal 227 might be routed through real-time location tracking system 230 with directional vector information as an alternative to deriving aim point 245 via camera 249, if real-time location tracking system 230 is configured to track the orientation and thus directional vector of ID 210. As previously discussed, this particular configuration would determine an aim line or direction vector by extending a line from ID 210 to an intersection with display 240, represented as aim point 245. Server 250 may then further process the aim line to derive a projectile trajectory, applying environmental interactions or physics effects as desired.

Signal encoder 226 might, as in FIG. 1, provide trigger signal 227 as an infrared signal for reading by camera 249. Although trigger signal 227 may be encoded such that it only includes enough information to associate it with identifier 216, trigger signal 227 might additionally contain input data concerning the particular triggers pulled or buttons pressed by the user. With just the association with identifier 216, camera 249 can provide signal decoder 252 running on server processor 251 of server 250 with the position of aim point 245 to calculate a projected aim line or direction vector for deriving a projectile trajectory associated with ID 210. With additional embedded input data, server 250 can support additional interaction flexibility, for example by differentiating between several different triggers or buttons each having a unique effect. Although positional data might also be embedded in trigger signal 227, in one embodiment, one may use a dedicated tracking system instead such as real-time location tracking system 230, which can track the location of IDs continuously or on-demand.

Thus, by obtaining the position or movable origin point of ID 210 from real-time location tracking system 230 by comparing identifier 216 from trigger signal 227 against local ID position database 235, server processor 251 executing trajectory calculator 253 can determine where the rendered projectile trajectory should originate, and further apply any desired physics transformations to the projectile trajectory. This projectile trajectory can then be processed by interactive application service 255 to calculate interferences and interactions with a virtual 3D environment, which might support a multiplayer shooting game system or another interactive experience.

Once interactive application service 255 determines the proper responses for trigger signal 227, the responses can be translated into actions by, for example, rendering a visual result with 3D projection system 241, modifying parameters within user account database 256, or triggering an effect with show control system 291. For example, as with FIG. 1b, a visual indication of the projectile might be rendered on display 240 as sensory feedback 290 within a projected 3D environment using 3D projection system 241. Show control system 291 could initiate additional flashy effects for added dramatic appeal, such as lighting effects, sounds, scoring, and movement of objects in the environment.

Another example might involve a game service application supporting multiple users divided into teams fighting in a competitive gun battle. User statistics related to game state such as accuracy, health, and other variables could be stored in user account database 256 to be updated depending on the results of incoming trigger signals. Thus, for example, if ID 210 is recorded to shoot down the most IDs on the opposing team, the user of ID 210 might be awarded an "MVP" medal at the end of the game. Another user might be awarded a "Sniper" medal for the highest accuracy rating, whereas yet another user might be awarded a "Survivalist" medal for having the highest health rating. Thus, by combining the hybrid six degrees of freedom detection system of FIG. 2 with elements of multi-player networked games, users can experience exhilarating and rewarding gameplay with the potential for long staying power by introducing fresh new game mechanics and rewarding incentives.

Therefore, the ability to use a free roaming ID in an environment potentially having hundreds or more actively participating IDs gives users a natural feeling of freedom and an appreciation of scale previously lacking in other systems. Since IDs are tracked with the hybrid six degrees of freedom detection system of FIG. 2, users are free to hold or carry the IDs in any manner desired and roam freely in an environment with a wide encompassing detection range. IDs are afforded wide latitude for movement relative to motion detection equipment, freeing users from being tethered to cumbersome existing motion detecting systems that limit user movement relative to detection equipment. Thus, in contrast to systems with severely restricted positional movement such as arcade game machines, home consoles connected to a stationary display, or hard-mounted installations, structures, or vehicles, users of the ID with the hybrid tracking system are free to roam about in a large environment with the ID acting as a bridge to interact with the environment in an intuitive and natural way. As a result, users may experience much greater satisfaction from their experiences, with greater mobility and freedom enhancing user control, involvement, and immersion.

Moreover, by providing various upgrades physically attachable to the ID, users can enjoy a sense of advancement and achievement as they customize and upgrade their individual IDs. For example, physically attachable accessories to ID 210 might be purchased or earned by exchanging the medals described above, which can affect gameplay in various ways. For example, a snap-on barrel extender might increase speed or range, a power-up clip might customize projectile properties, a sighting scope might improve accuracy by increasing the hit window, and an attachable display might provide a HUD (heads-up display) for data such as a score counter, remaining ammunition, or other information. By attaching these tangible accessories, the sensory feedback may be correspondingly modified as well. With the barrel extender, the visual depiction of the projectile might move faster or travel farther. With the power-up clip, the projectile might increase in size, change colors, or affect some other characteristic. With the sighting scope, the size of the "explosion" rendered on impact within the 3D environment might increase in size, indicating the larger hit window. With the HUD, additional status information might be provided for enemy targets. By physically connecting these "power-up" accessories to an ID and immediately appreciating the effects through the changes in the sensory feedback, users can feel empowered and motivated to continue playing the game system. This is opposed to merely obtaining a virtual, intangible power-up as with a conventional game system, which may not evoke the same emotional response as actually having a tangible add-on.

Figure 3A:
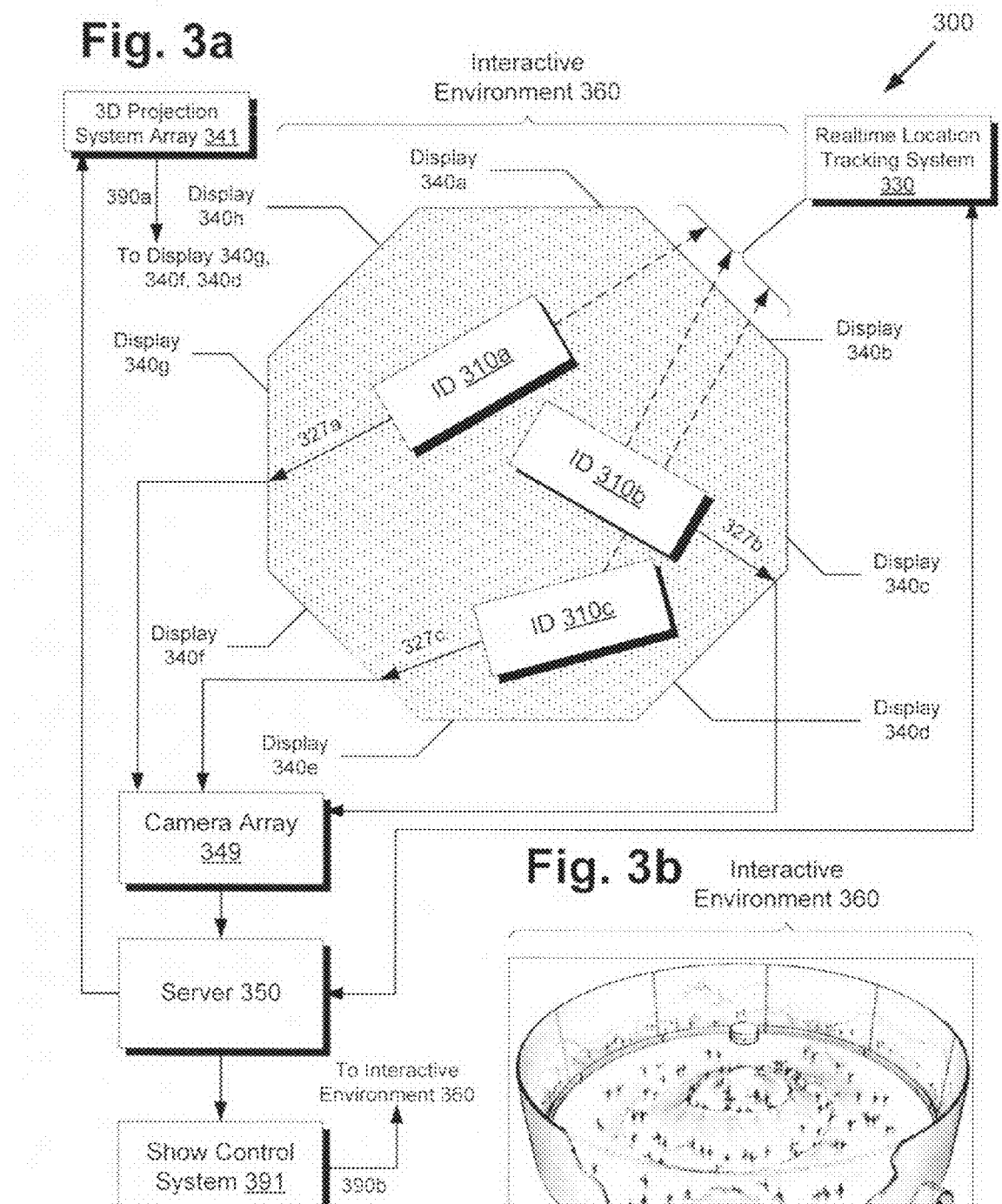
FIG. 3a and FIG. 3b present diagrams of an exemplary projected three-dimensional interactive environment for use with an interface device (ID), according to one embodiment of the present invention.
Figure 3B:
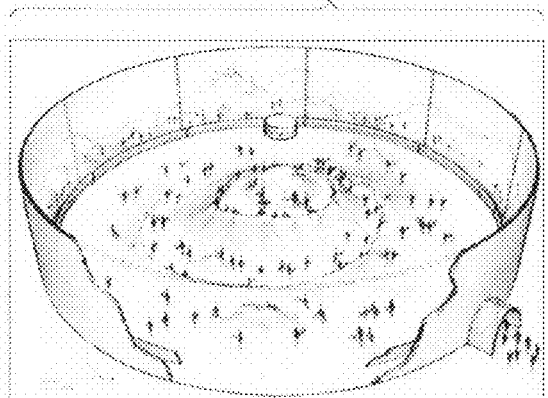

FIG. 3a and FIG. 3b present diagrams of an exemplary three-dimensional interactive environment for use with an ID, according to one embodiment of the present invention. Environment 300 of FIG. 3a includes real-time location tracking system 330, 3D projection system array 341, camera array 349, server 350, interactive environment 360, sensory feedback 390a-390b, and show control system 391. Interactive environment 360 includes displays 340a-340h, IDs 310a-310c, and trigger signals 327a-327c.

Real-time location tracking system 330 corresponds to real-time location tracking system 230 from FIG. 2. 3D projection system array 341 corresponds to 3D projection system 241. Camera array 349 corresponds to camera 249. Server 350 corresponds to server 250. Sensory feedback 390a corresponds to sensory feedback 290. Show control system 391 corresponds to show control system 291. Displays 340a-340h correspond to display 240. IDs 310a-310c correspond to ID 210. Trigger signals 327a-327c correspond to trigger signal 227.

FIG. 3a depicts an exemplary environment similar to the competitive gun battle example used above with FIG. 2. FIG. 3b shows an artist rendering of what FIG. 3a may look like populated with multiple users each having an ID. Users might be split into two different teams, with each team having a separate arena similar to interactive environment 360 of FIG. 3a. By employing real-time location tracking system 330, multiple screens including displays 340a-340h, 3D projection system array 341, and camera array 349, the locations, orientations, and interactions with multiple IDs can be monitored and reacted to accordingly by server 350. Displays 340a-340h may be setup similarly to display 140 from FIG. 1, and may aggregately show a virtual depiction of an opposing team. Server 350 may receive data regarding IDs in an interactive environment of the opposing team, and server 350 can also report data regarding ID 310a to 310c to other servers. As with FIG. 2, show control system 391 might provide effects in the form of sensory feedback 390b to be sent to interactive environment 360, and 3D projection system array 341 might provide a visualization of a 3D environment on displays 340*a*-340*h*, including sensory feedback 390*a*. In this manner, even though the users from each team might be in physically different arenas, it may feel like they are directly interacting with each other. Combined with a networked environment, it may be possible even to implement remote battles across the country or around the world, providing a new and exciting virtualized yet very visceral interactive experience. While multi-player networked games may already enjoy considerable success, particularly in the context of virtual online worlds displayed on a personal computer or video game console, developers have yet to implement 3D game systems in a manner that allows the freedom and degree of movement enabled by the ID.

Of course, a competitive gun game is merely one possible embodiment, and many other embodiments may also be utilized. For example, amusement parks may combine the system described in FIG. 2 with existing physical infrastructure, such as guided rides or queue lines. One example might involve shooting at balloons and prizes in a rail cart guided carnival ride. Another example might involve using a video theater, with patrons participating in a spaceship battle depicted on the theater screen. Yet another example might provide entertainment to patrons waiting in a queue, allowing them to play interactive games projected on the walls of the queuing area. This example might also be extended to stand alone as its own attraction, such as a haunted house with a linear walkthrough path, or an obstacle course, with integrated 3D interactions.

Additionally, affecting a stereoscopic 3D environment is not necessarily a requirement, and interactions might affect the physical world rather than a 3D projection on a 2D screen. For example, a "magic wand" might be waved in a particular manner to light up decorations and parade floats, make water fountains dance, and cause fireworks to shoot in the sky. In this case, the "magic wand" would comprise the ID, and if the user waves the ID in a particular manner, a server might contact a show control system to initiate the effects as described above. While the example applications given above might be implemented in some alternative manners using, for example, hard-mounted or tethered devices, the degree of motion freedom, location flexibility, and scalability for high numbers of concurrent IDs allows the hybrid tracking system and the ID described in this application to enable new implementations not feasible or practical with conventional systems.

FIG. 4 shows a flowchart describing the steps, according to one embodiment of the present invention, by which an interface device (ID) capable of free roaming movement can provide a sensory feedback attributable to a user interaction with the ID. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 200 of FIG. 2, step 410 of flowchart 400 comprises processor 211 of ID 210 reading, via transmitter 225, a sensed location of at least one point of ID 210 in three-dimensional space. As previously discussed, an embedded RFID tag, an optical transmitter, a magnetic transmitter leveraging the Hall effect, or an ultrasonic sound wave propagator may provide position sensing capabilities for implementing step 410.

Referring to step 420 of flowchart 400 in FIG. 4 and diagram 200 of FIG. 2, step 420 of flowchart 400 comprises processor 211 of ID 210 reading, via camera 249, a sensed location of aim point 245 in three-dimensional space. This step may be initiated via signal encoder 226 emitting trigger signal 227 as an encoded infrared signal. As previously discussed, camera 249 might comprise an infrared camera capable of detecting trigger signal 227 to sense the location of aim point 245 on display 240. However, camera 249 might alternatively use optical, magnetic, or sound transmission for detecting trigger signal 227, with signal encoder 226 correspondingly modified to use the alternative transmission method.

Referring to step 430 of flowchart 400 in FIG. 4 and diagram 200 of FIG. 2, step 430 of flowchart 400 comprises processor 211 of ID 210 determining, via a direction vector determination device, a direction vector indicating a direction in which ID 210 is pointing. In one embodiment, the points sensed in steps 410 and 420 can be used to calculate the direction vector intersecting those points. In this case, the direction vector determination device would comprise transmitter 225 providing the points in step 410, camera 249 providing the points in step 420, and processor 211 extrapolating the direction vector from those points. As previously discussed, if steps 410 or 420 are able to provide multiple point samples, then the multiple point samples may be utilized to possibly increase the accuracy of the direction vector.

In another embodiment, step 420 might be skipped, and an alternative device may provide information for deriving the direction vector. For example, orientation hardware 221 might provide orientation readings for ID 210 via accelerometers or other devices. The orientation readings could then be combined with the points sensed in step 410 to calculate the direction vector. At the end of step 430, the direction vector pointing towards aim point 245 on display 240 is derived and ready for further processing.

Referring to step 440 of flowchart 400 in FIG. 4 and diagram 200 of FIG. 2, step 440 of flowchart 400 comprises processor 211 of ID 210 transmitting, via transmitter 225, input data in response to a user interaction with user interface hardware 222 and aim information indicating the position of ID 210 from step 410 and the direction vector from step 430 to server 250 implementing interactive application service 255. The input data may include the state of buttons, triggers, and other input hardware provided by user interface hardware 222. As previously discussed, transmitter 225 may not necessarily use the same communications channels used for positional sensing in step 410. For example, a dedicated radio channel may be used for intercommunication with server 250.

After step 440, the hybrid six-degrees of freedom tracking system implemented by server 250 can proceed to ultimately provide sensory feedback 290. By using the data transmitted in step 440, interactive application service 255 can provide sensory feedback 290 such that a user of ID 210 can associate his interactions with ID 210. This association can be accomplished by, for example, accurately depicting a projectile trajectory on display 240 such that it visually appears to the user to originate from ID 210. Alternatively or additionally, haptic or force feedback, sounds or lighting or color matching, coordinated movement of objects within the environment, and other means may be used to establish a link between ID 210 and sensory feedback 290 for the user.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of providing a sensory feedback in response to user interactions with a three-dimensional environment shown on a display, the method comprising:
    showing the three-dimensional environment on the display;
    receiving, from a first position sensor of an interface device, a first sensed location of at least one point of the interface device having a free roaming movement in a three-dimensional space;
    determining an aim point being aimed at by the interface device, wherein the aim point is a point on the display;
    receiving the first sensed location and the aim point;
    deriving a projectile trajectory of a simulated object travelling from the interface device based on the first sensed location and the aim point, wherein the projectile trajectory is calculated based on a velocity associated with the simulated object;
    determining a collision point in the three-dimensional environment based on the projectile trajectory; and
    displaying, on the display, the collision point in the three-dimensional environment, as the sensory feedback.

2. The method of claim 1, wherein first sensed position is measured with respect to a fixed reference in space around the interface device.

3. The method of claim 1, wherein the aim point is determined using a camera.

4. The method of claim 3, wherein the camera is operable to determine the aim point as the point on the display.

5. The method of claim 1, wherein the collision point is different than the aim point.

6. A sever for providing a sensory feedback in response to user interactions with a three-dimensional environment shown on a display, the sever comprising:
    a server processor configured to:
        show the three-dimensional environment on the display;
        receive, from a first position sensor of an interface device, a first sensed location of at least one point of the interface device having a free roaming movement in a three-dimensional space;
        determine an aim point being aimed at by the interface device, wherein the aim point is a point on the display;
        receive the first sensed location and the aim point;
        derive a projectile trajectory of a simulated object travelling from the interface device based on the first sensed location and the aim point, wherein the projectile trajectory is calculated based on a velocity associated with the simulated object;
        determine a collision point in the three-dimensional environment based on the projectile trajectory; and
        displaying, on the display, the collision point in the three-dimensional environment, as the sensory feedback.

7. The server of claim 6, wherein first sensed position is measured with respect to a fixed reference in space around the interface device.

8. The server of claim 6, wherein the aim point is determined using a camera.

9. The server of claim 8, wherein the camera is operable to determine the aim point as the point on the display.

10. The server of claim 6, wherein the collision point is different than the aim point.

* * * * *